US010677165B2

(12) United States Patent
Roche

(10) Patent No.: US 10,677,165 B2
(45) Date of Patent: Jun. 9, 2020

(54) HEAT EXCHANGER SYSTEM FOR AN AIRCRAFT TURBOMACHINE

(71) Applicant: Safran Power Units, Toulouse (FR)

(72) Inventor: Amandine Roche, Toulouse (FR)

(73) Assignee: SAFRAN POWER UNITS, Toulouse (FR)

( * ) Notice: Subject to any disclaimer, the term of this patent is extended or adjusted under 35 U.S.C. 154(b) by 320 days.

(21) Appl. No.: 15/117,904

(22) PCT Filed: Feb. 10, 2015

(86) PCT No.: PCT/FR2015/050316
§ 371 (c)(1),
(2) Date: Aug. 10, 2016

(87) PCT Pub. No.: WO2015/121576
PCT Pub. Date: Aug. 20, 2015

(65) Prior Publication Data
US 2016/0369699 A1     Dec. 22, 2016

(30) Foreign Application Priority Data

Feb. 11, 2014  (FR) ...................................... 14 51057

(51) Int. Cl.
*F02C 7/18* (2006.01)
*F02C 7/047* (2006.01)
(Continued)

(52) U.S. Cl.
CPC ................ *F02C 7/185* (2013.01); *F02C 7/04* (2013.01); *F02C 7/047* (2013.01); *F02C 7/055* (2013.01); *Y02T 50/675* (2013.01)

(58) Field of Classification Search
CPC .. F02C 7/185; F02C 7/047; F02C 7/06; F02C 7/12; F02C 7/14; F02C 7/05; F02C 7/055;
(Continued)

(56) References Cited

U.S. PATENT DOCUMENTS 2,798,361 A * 7/1957 Hiersch ..................... F02K 7/10
                                                                       60/267
3,262,636 A   7/1966 Palfreyman
(Continued)

FOREIGN PATENT DOCUMENTS

EP     1 630 358 A2    3/2006
EP     1 895 123 A2    3/2008
(Continued)

OTHER PUBLICATIONS

Jamshidi, Int. Comm. Heat and Mass Transfer 39 (2012) 311-317 (Year: 2012).*
(Continued)

*Primary Examiner* — Steven M Sutherland
(74) *Attorney, Agent, or Firm* — Pearne & Gordon LLP

(57) ABSTRACT

A heat exchange system in a turbomachine that comprises a plurality of members and equipment to be cooled and/or lubricated, the heat exchange system includes a fluid circuit for cooling and/or lubricating the equipment, the heat exchange system being configured to bring the fluid circuit in thermal contact with a fluid, wherein the heat exchange system further includes an open work structure which is in thermal contact with at least one hot section of the fluid circuit and through which the fluid passes.

7 Claims, 3 Drawing Sheets

(51) Int. Cl.
*F02C 7/04* (2006.01)
*F02C 7/055* (2006.01)

(58) Field of Classification Search
CPC .............................. Y02T 50/675; F28D 7/163; F28D 2001/0273
See application file for complete search history.

(56) References Cited

U.S. PATENT DOCUMENTS

| | | | | |
|---|---|---|---|---|
| 3,477,505 A * | 11/1969 | McGann | ................... | F02C 7/08 165/164 |
| 4,187,675 A * | 2/1980 | Wakeman | ............... | F02C 7/185 165/163 |
| 2005/0023412 A1 | 2/2005 | Baptist | | |
| 2008/0053099 A1* | 3/2008 | Venkataramani | ....... | F01D 25/12 60/772 |
| 2008/0279688 A1* | 11/2008 | Jensen | ...................... | F01D 5/08 416/95 |
| 2012/0216544 A1* | 8/2012 | Eleftheriou | ............... | F02C 7/08 60/772 |
| 2013/0186102 A1* | 7/2013 | Lo | ............................ | F02C 7/18 60/785 |
| 2013/0219915 A1* | 8/2013 | Prociw | ................... | F02C 7/224 60/782 |
| 2014/0216056 A1* | 8/2014 | Schwarz | ................. | F02C 7/185 60/806 |
| 2015/0135726 A1* | 5/2015 | Hundley, Jr. | ............. | F02C 7/12 60/796 |

FOREIGN PATENT DOCUMENTS

| | | |
|---|---|---|
| EP | 1 895 141 A2 | 3/2008 |
| EP | 2 339 123 A1 | 6/2011 |
| FR | 2 958 974 A1 | 10/2011 |
| GB | 626571 A * | 7/1949 ............ B64D 15/06 |
| GB | 626571 A | 7/1949 |

OTHER PUBLICATIONS

Search Report issued in French Patent Application No. 14 51057 dated Nov. 10, 2014.
International Search Report issued in Application No. PCT/FR2015/050316 dated May 15, 2015.
Written Opinion issued in Application No. PCT/FR2015/050316 dated May 15, 2015.

\* cited by examiner

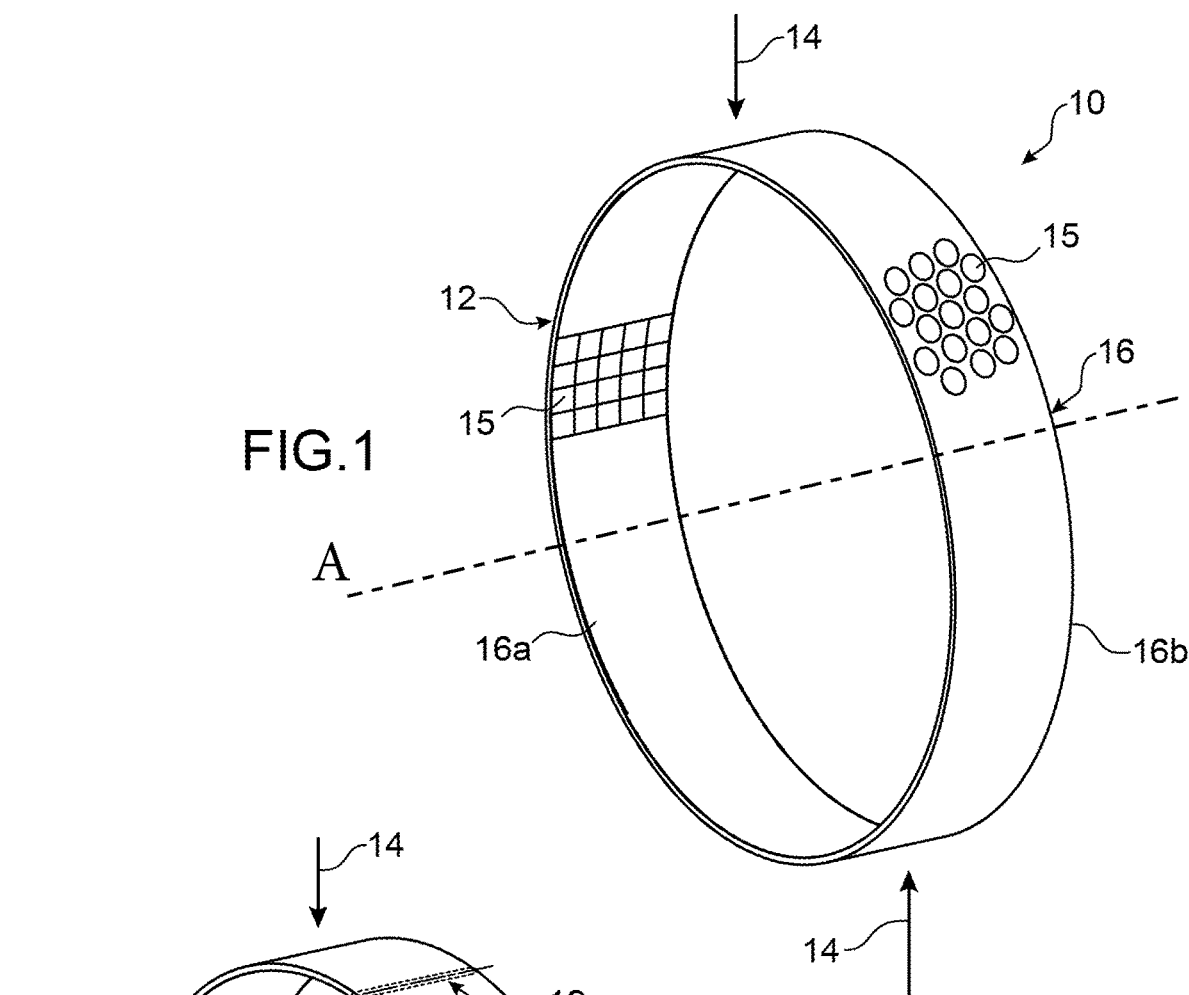
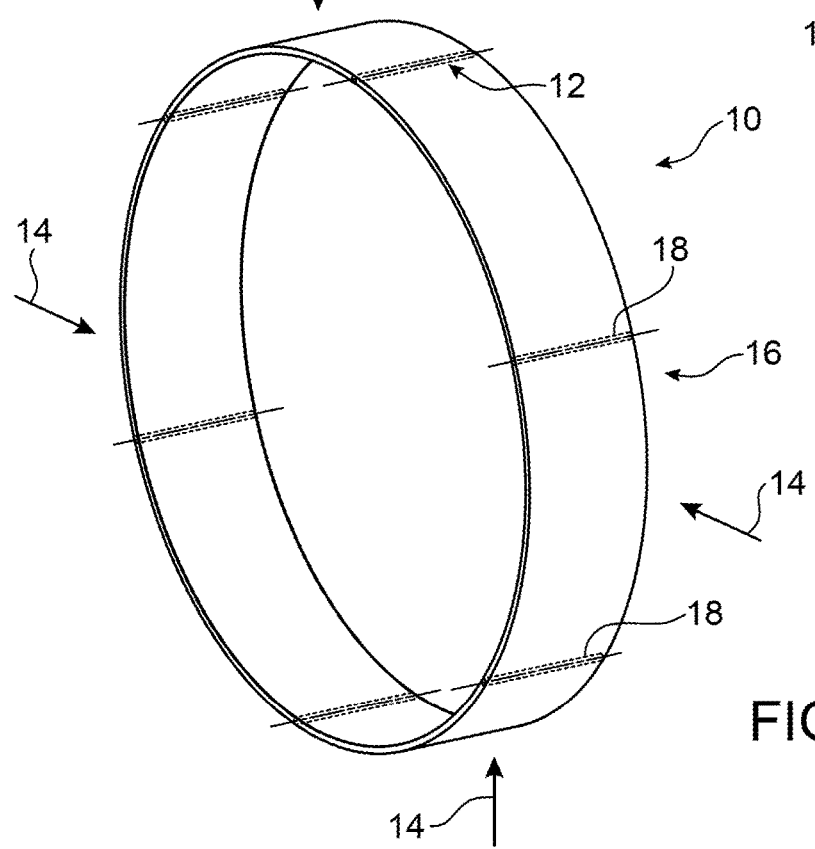

HEAT EXCHANGER SYSTEM FOR AN AIRCRAFT TURBOMACHINE

TECHNICAL FIELD

The invention relates to a heat exchanger system for an aircraft turbomachine including a radial air inlet.

The invention more particularly provides a heat exchanger system for cooling a lubricating and/or cooling fluid for equipment of the turbomachine, in which the cold source of the heat exchanger consists of the airflow rate at the inlet of the turbomachine.

STATE OF PRIOR ART

An aircraft turbomachine includes a plurality of members and equipment which have to be constantly lubricated and/or cooled upon operating the turbomachine.

These lubricating and cooling functions are ensured by a lubricating fluid which is thus likely to be warmed up.

To limit the temperature of this fluid, it is known to equip the turbomachine with one or more heat exchange devices, which are configured to exchange heat between the fluid and a cold source which is formed by the ambient air flowing in proximity of the turbomachine outer case or which is formed by an ambient airflow dedicated to this function.

Numerous solutions have been adopted to provide the heat exchanger, in particular at the air inlet of the turbomachine, as described in document FR-A-2.958.974, in which the heat exchanger is arranged in the air inlet duct of the turbomachine.

Such solutions involve adding a component to the turbomachine to form the heat exchanger, that is increasing the mass and complexity of the turbomachine.

DISCLOSURE OF THE INVENTION

The purpose of the invention is to provide a heat exchanger system integrated in the general structure of the turbomachine, which also plays the role of an anti-icing system of the air inlet of the turbomachine.

For that purpose, the invention provides a heat exchange system in a turbomachine comprising a plurality of members and equipment to be cooled and/or lubricated, said system comprising a fluid circuit for cooling and/or lubricating said equipment, said heat exchange system being configured to bring said fluid circuit into thermal contact with a fluid playing the role of a cold source on the other hand, characterized in that the heat exchange system includes an open work structure which is in thermal contact with at least one hot section of the fluid circuit and through which an intake airflow of the turbomachine forming the cold source passes.

This open work structure used for providing the heat transfer between the hot fluid and the intake airflow which makes up the cold source makes it possible to use the heat removed from the hot fluid to warm up the solid structure, in order to avoid any water or ice crystals accretion on this structure, which could have been brought by the airflow taken in upon operating the turbomachine under icing conditions.

Thereby, this makes it possible to combine the heat exchange function by cooling the lubricating and/or cooling fluid with the anti-icing function at the air inlet by virtue of the temperature of the open work structure which is higher than 0° C.

Preferably, the open work structure is hollow and the fluid passes through it.

Preferably, at least one section of the fluid circuit forms part of the open work structure.

Preferably, the open work structure includes a grid made from several sections of the fluid circuit which are distributed in the open work structure.

Preferably, the open work structure has a cylindrical shape and includes several sections of the fluid circuit parallel to each other and parallel to the main axis of the open work structure.

Preferably, the open work structure has a cylindrical shape and said at least one section of the fluid circuit forms a substantially helical winding coaxial to the main axis of the open work structure.

Preferably, the open work structure has an annular planar shape and includes several sections of the fluid circuit which are radially oriented with respect to the main axis of the open work structure.

Preferably, the open work structure has an annular planar shape and said at least one section of the fluid circuit forms a generally spiral-shaped winding centred on the main axis of the open work structure.

BRIEF DESCRIPTION OF THE DRAWINGS

Further characteristics and advantages of the invention will appear upon reading the detailed description that follows for the understanding of which the appended figures will be referred to, in which:

FIG. 1 is a schematic representation of a heat exchange system in accordance with a first embodiment of the invention;

FIG. 2 is a view similar to that of FIG. 1, showing another embodiment of the invention;

DETAILED DISCLOSURE OF PARTICULAR EMBODIMENTS

Figure 4:
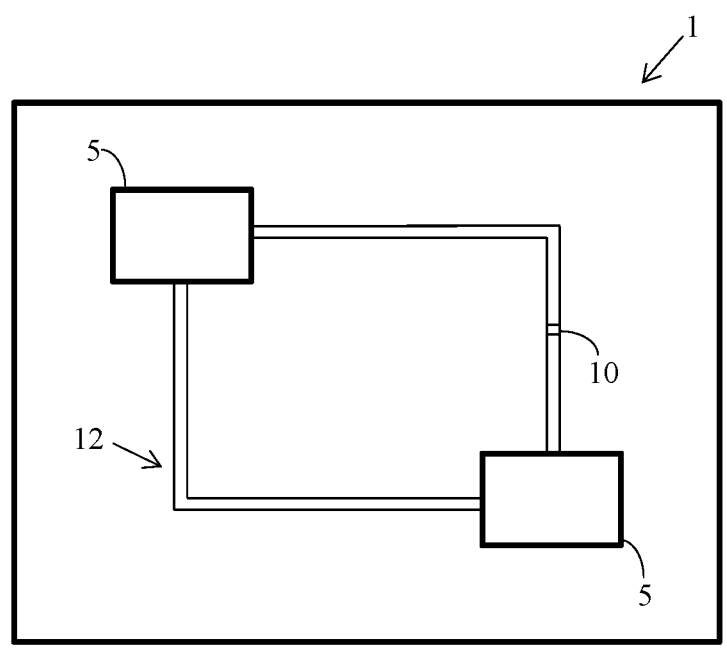
FIG. 4 is a schematic representation of a turbomachine employing a heat exchange system.

In the figures, with specific reference to FIG. 4, a part of a heat exchange system 10 for a turbomachine 1 configured with a radial air inlet, for example an aircraft turbomachine, is represented.

The turbomachine 1 includes a plurality of components and members (e.g., equipment 5) which heat up during operation of the turbomachine 1, and which need to be cooled or lubricated continuously.

For this, the turbomachine 1 includes a main fluid circuit which feeds all the components and members of the turbomachine 1 with a fluid which is able to lubricate or cool them.

The main fluid circuit is associated with a heat exchange system 10 represented in the figures, which enables the fluid which has flown through these components and members to be cooled.

The heat exchange system 10 includes a fluid circuit 12 which is connected to the main fluid circuit or which makes up the same and it is configured for a heat exchange to occur between the hot fluid and a cold source 14.

For this, the heat exchange system 10 is configured to bring the fluid circuit 12 into thermal contact with the cold source 14.

Here, the cold source 14 consists of an airflow, for example the airflow which is taken in the turbomachine. This airflow is at a temperature close to the ambient outside temperature, which can be very low, especially when the aircraft flies at a high altitude.

To give heat to the airflow 14 taken in from the fluid of the fluid circuit 12, the heat exchange system 10 includes an open work structure 16 including a plurality of apertures 15 through which the airflow 14 passes and which is in thermal contact with the fluid of the fluid circuit.

Preferably, the open work structure 16 of the heat exchange system 10 is heated by the hot fluid, which prevents the ice crystals accretion or build up on the same, at the air inlet of the turbomachine, when the aircraft flies under icing outside conditions.

Thus, the heat exchange between the hot fluid flowing in the fluid circuit 12 and the airflow passing through the open work structure 16 makes it possible to both cool fluid and warm up the open work structure 16 to limit ice crystals accretion.

To exchange heat with the fluid, the open work structure 16 is designed for the hot fluid to pass therethrough.

To that end, according to a first embodiment represented in FIG. 1, the open work structure 16 consists of a hollow element, for example made by assembling two plates also open work, structure through which the hot fluid passes.

Here, the open work structure 16 is of a cylinder of a revolution shape, and it is connected to the fluid circuit 12 at both its axial ends. The airflow passes through the open work structure 16 radially, with respect to its main axis A.

The open work structure 16 consists of an assembly of two coaxial cylindrical open work plates in which apertures 15 have a circular or rectangular shape for example.

The open work structure 16 can consist of a double skin system, the inner skin of which is in contact with the hot fluid and the outer skin in contact with the taken in airflow 14.

A first axial end 16a of the open work structure is open and forms an inlet for the hot fluid, the second axial end 16b of the open work structure 16 is also open and forms an outlet for the cooled fluid.

According to another embodiment represented in FIG. 2, the open work structure 16 forms a grid which is partly made from sections 18 of the fluid circuit 12.

Once again, the open work structure 16 has a cylindrical shape of revolution. The sections 18 of the fluid circuit 12 are all parallel to the main axis A of the open work structure 16 and they are evenly distributed or not about the main axis A of the open work structure 16.

The sections 18 of the fluid circuit 12 make up structural elements of the open work structure 16, such that the heat transfer is carried out by heat conduction with the other components of the open work structure 16 and by direct heat exchange with the airflow 14.

Figure 3:
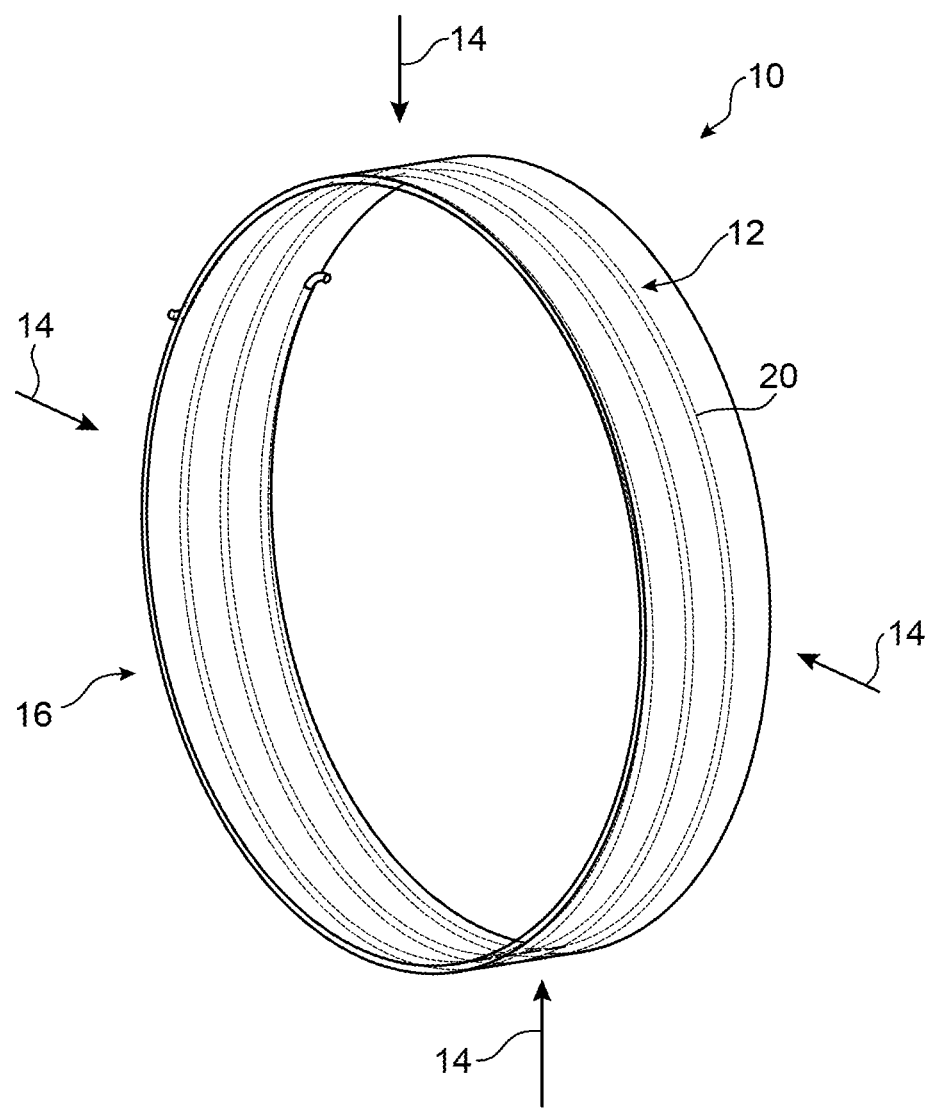
FIG. 3 is a view similar to that of FIG. 1, showing yet another embodiment of the invention.

According to an alternative embodiment, represented in FIG. 3, the open work structure 16 includes a grid, and a section 20 of the fluid circuit 12 forms a structural element of the open work structure 16. This section 20 of the fluid circuit 12 is in the form of a helical winding coaxial to the main axis A of the open work structure 16. According to another alternative not represented, the open work structure 16 includes several sections 20 of a helical winding shape.

It will be understood that the invention is not limited to these embodiments only and that the heat exchange system 10 can include a combination of the preceding embodiments.

For example, the heat exchange system 10 can include an open work structure 16 of a grid shape consisting of sections 18 parallel to the main axis of the open work structure 16 and from at least one section 20 having a helical shape.

Thus, the open work structure 16 can consist of a double skin structure, the outer skin of which is in contact with the airflow 14 and which includes inner tubes formed from sections 18, 20 of the fluid circuit 12. The heat transfer between the outer skin and the inner tubes is made for example by thermal bridges.

Thus, according to another embodiment not represented, the open work structure 16 has a planar ring shape, that is having an axial air inlet. According to this embodiment, the section(s) of the fluid circuit 12 making up the open work structure 16 either are rectilinear sections radially oriented with respect to the main axis of the open work structure 16, or one or more section(s) of a spiral shape centred on the main axis of the open work structure 16.

Or, when the open work structure 16 of a planar ring shape consists of a hollow element, it is made by assembling two parallel planar open work plates and is open at each of its inner and outer radial ends.

What is claimed is:

1. A heat exchange system in a turbomachine comprising a plurality of equipment to be cooled and/or lubricated, the heat exchange system comprising:
   a fluid circuit for cooling and/or lubricating said equipment, said heat exchange system being configured to bring said fluid circuit in thermal contact with a cold source; and
   a grid-shaped open work structure having a cylindrical shape and comprising a circumferential wall through which a turbomachine intake airflow forming the cold source passes, wherein all sections of the fluid circuit configured to be in thermal contact with the cold source are all embedded within the circumferential wall of the grid-shaped open work structure.

2. The heat exchange system according to claim 1, wherein the grid-shaped open work structure includes several sections of the fluid circuit which are parallel to each other and parallel to a main axis of the grid-shaped open work structure.

3. The heat exchange system according to claim 2, wherein the main axis of the grid-shaped open work structure is a longitudinal axis of the grid-shaped open work structure.

4. The heat exchange system according to claim 3, wherein the turbomachine intake airflow flows through the grid-shaped open work structure in a radial direction with respect to the main axis.

5. The heat exchange system according to claim 1, wherein the grid-shaped open work structure includes at least one section of the fluid circuit which forms a substantially helical winding coaxial to a main axis of the grid-shaped open work structure.

6. The heat exchange system according to claim 5, wherein the main axis of the grid-shaped open work structure is a longitudinal axis of the grid-shaped open work structure.

7. The heat exchange system according to claim 6, wherein the turbomachine intake airflow flows through the grid-shaped open work structure in a radial direction with respect to the main axis.

* * * * *